Oct. 17, 1944.  C. B. MOORE  2,360,705
PNEUMATIC COMPARATOR GAUGE
Filed Feb. 1, 1943
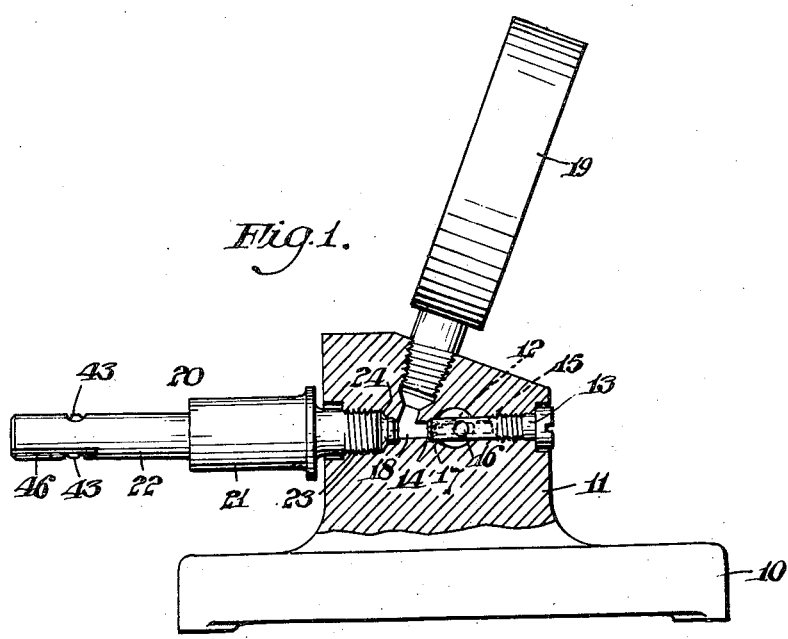
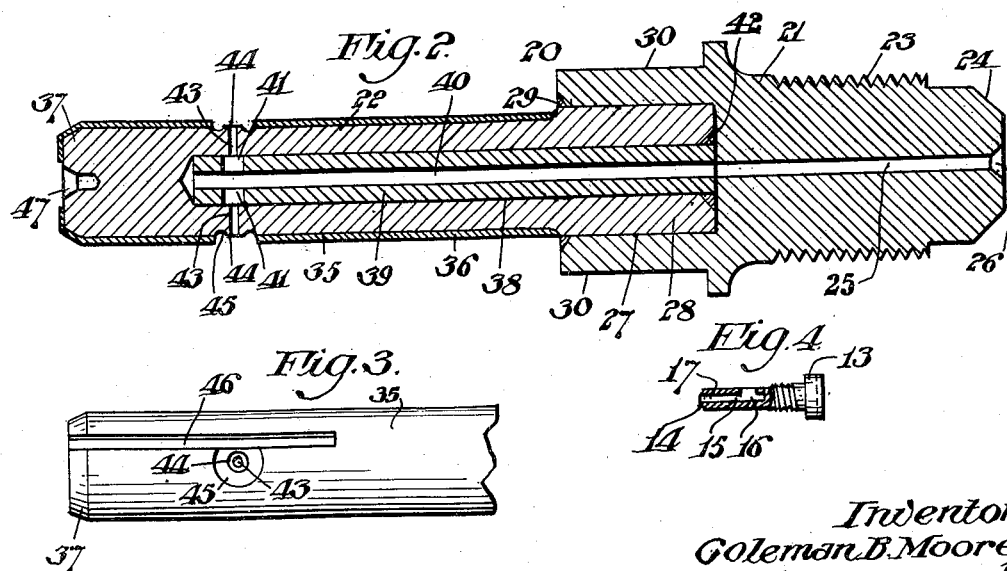
Inventor:
Coleman B. Moore,
By J. T. Wobensmith
Attorney.

Patented Oct. 17, 1944

2,360,705

UNITED STATES PATENT OFFICE 2,360,705

PNEUMATIC COMPARATOR GAUGE

Coleman B. Moore, Carroll Park, Pa., assignor to Moore Products Co., Philadelphia, Pa., a co-partnership consisting of Coleman B. Moore, Charles H. Thompson, Walter G. Trumbower, and Robert Buhner Application February 1, 1943, Serial No. 474,266

7 Claims. (Cl. 33—178)

This invention relates to pneumatic comparator gauges and more particularly to improvements in the construction and operation of such gauges.

Pneumatic gauges have heretofore been proposed, operating upon the principle that if a fluid under constant pressure is forced through a pair of orifices in series with one another the gaseous pressure in the space between the orifices will be a function of the relative sections of the orifices, and the measurement of the gaseous pressure will indicate the effective area of the discharge orifice as varied by the position of the work with respect thereto, within certain limits.

In gauges of this general type with one or more discharge orifices no adequate provision has heretofore been made to protect the parts exposed to wear resulting from contact with the work to be gauged. Furthermore, the interior space was frequently made of such size that the response characteristics either as to sensitivity or as to speed were not wholly satisfactory.

It is the principal object of the present invention to provide an improved pneumatic comparator gauge which may be constructed with a minimum of complication and with improved accuracy, sensitivity and speed of response.

It is a further object of the present invention to provide adequate protection of the measuring points of a pneumatic comparator gauge.

It is a further object of the present invention to increase the useful life of a pneumatic comparator gauge by making adequate provisions for taking care of wear.

Other objects of the invention will be apparent from the annexed specification and claims.

The nature and characteric features of the invention will be more readily understood from the following description, taken in connection with the accompanying drawing forming part hereof, in which:

Figure 1 is an elevational view, partly in vertical section, of a pneumatic gauge embodying the main features of the present invention;

Figure 2 is an enlarged central sectional view of a plug and adapter unit forming part of the present invention;

Fig. 3 is an external view of the plug unit forming part of the present invention; and Fig. 4 is a view partly in elevation and partly in section illustrating certain details of the restriction member.

It will, of course, be understood that the description and drawing herein are illustrative merely, and that various modifications and changes may be made in the structure disclosed without departing from the spirit of the invention.

Referring more particularly to the drawing the pneumatic comparator gauge therein illustrated is of the internal type for measuring bores to ascertain the diameter, taper, out of round or bell-mouth condition thereof.

The gauge includes a base 10 having an upstanding portion 11 with a supply connection 12 to which fluid at substantially constant pressure, preferably pressure regulated and filtered air, is supplied.

The supply connection 12 is in communication with the exterior of a restriction member in the form of a restriction screw 13 which is removable for cleaning. The restriction screw 13 has a seat 14 at the inner end thereof and has a hollow interior 15 in communication with the supply connection 12 through one or more openings 16. The interior space 15 is terminated at the inner end with a constriction in the form of a port 17 of predetermined bore for effecting a reduction of pressure of the supply fluid. The constriction or port 17 is in communication with a central passageway 18 in the base portion 11 and the passageway 18 is in communication with a pressure gauge 19, preferably of the Bourdon dial type for ascertaining the pressure conditions prevailing in the central passageway 18 and the spaces directly in communication therewith. The pressure gauge 19 is preferably calibrated in dimensional units or with upper, zero and lower dimensional limits thereon.

The upstanding base portion 11 carries, preferably on one side thereof, a removalle gauge plug and adapter unit 20. The unit 20 is preferably made removable so that the same may be replaced with another unit of the same gauging characteristics for maintaining continuity of gauging upon the occurrence of wear, or with other units having different gauge plugs for gauging bores of different internal diameters.

The gauge plug and adapter unit 20 preferably includes an adapter member 21 and a gauge plug member 22. The adapter member 21 has an externally threaded section 23 for engagement with an internally threaded bore in the base portion 11. The inner end of the adapter member 21 and the inner end of the bore are preferably tapered, as at 24, to provide a fluid tight seat for the adapter member 21. The adapter member 21 also has an internal passageway 25 which is larger in diameter than the port 17 and in communication with the central passageway 18, the inner end 26 being chamfered to provide a grinding center. The adapter member 21 also has a bore 27 within which the inner end or shank 28 of the gauge plug 22 is received with a fluid tight fit. Solder may be provided, as at 29, for holding the gauge plug 22 in position with respect to the adapter member 21. The adapter member 21 is preferably made from cold rolled steel rod and has a pair of flats 30 for facilitating insertion and removal.

The gauge plug member 22 has a gauge portion 35 of predetermined length in accordance with the requirements for the work to be gauged and of finished predetermined external diameter in accordance with the internal bore of the work to be gauged.

The gauge plug 22 is preferably made of stainless steel rod and is hardened to maximum hardness, but may, if desired, be made of any other suitable material. The peripheral surface of the gauge plug 22 is ground to a predetermined size which is less than the desired finished diameter, is then plated, preferably with chromium, or other similar wear resistant material, as shown in a somewhat exaggerated manner at 36 (Fig. 2) and the exterior surface of the plating 36 is ground to the desired finished external diameter. The outer end 37 of the plug 22 is tapered to facilitate the application of the work to be gauged. The gauge plug has an internal bore 38 for the reception of an inserted plug 39 or sleeve of relatively soft and non-corrosive material, such as brass, or nickel silver. The inserted plug or sleeve 39 has a central hole 40, preferably of the same diameter as the passageway 25, and a pair of radial holes 41, and is preferably held in position in the gauge plug 22 by solder 42. The provision of a relatively large bore 38 in the gauge plug 22 and the mounting therein of the inserted plug 39 greatly simplifies the making of the gauge plug 22 and permits of reduction of the volume susceptible to pressure changes with resultant increase in speed.

The gauge plug 22 has nozzle openings 43 of predetermined diameter, preferably disposed as an opopsed pair, the nozzle openings 43 having the radial holes 41 in alinement therewith. The nozzle openings 43 preferably terminate at cylindrical surfaces 44 which are ground in alinement with and at the same time as the remaining portion of the external surface of the plug 22 before the plating. By constructing the gauge plug 22 in this manner the clearance between the work to be gauged and the ends of the nozzle holes 43 is determined and controlled by the thickness of the plating. Exact uniformity of shape, size, and length of nozzle holes is obtained and the use of the sleeve 39 permits of attaining uniformity of length of nozzle holes 43 on interchangeable plugs of the same size. Circular grooves 45 are provided outside the surfaces 44 and extending therebelow and longitudinal slots 46 are provided extending from the groove 45 to the outer end of the plug to permit of the free discharge of the gauging fluid.

The plug 22 is also provided with a drilled and chamfered hole 47 at the end thereof to serve as a grinding center. The chamfer 26 at the inner end of the adapter member 21 provides with the hole 47, centers for grinding, before and after plating and for regrinding as hereinafter pointed out.

The openings into the nozzles 43, the surfaces 44, the grooves 45, the slots 46 and the grinding center 47 are preferably shielded during the plating of the plug 22.

The manner of use of the gauge will now be pointed out. Gauging fluid at constant pressure, such as pressure regulated and filtered air, is supplied to the supply connection 12 and passes through the restriction member 13 where the pressure is reduced. The fluid passes through the central passageway 18, the internal passageway 25, the hole 40 and the radial holes 41 and discharges through the nozzles 43. The pressure prevailing at the central passageway 18 is effective at the dial gauge 19.

Upon placing the work to be gauged upon the plug 22 the discharge through the nozzles will be determined by the spacing of portions of the work from the surfaces 44. The fluid, upon its discharge from the nozzles 43 as restricted by the work to be gauged, exhausts freely through the grooves 45 and the slots 46. An equilibrium pressure condition is quickly established for a particular dimensional location in the work piece and may be read at the dial gauge 19 which is preferably marked in dimensional units or with limit points.

The use of the two nozzles 43 in diametral alinement compensates for side or radial motion of the work due to plug clearance, gives an averaging effect and for a particular position of the work permits of obtaining a reading of the diameter at that position. By rotating the work, variations in diameter will indicate an out of round condition. Similarly by moving the work longitudinally along the plug 22 variation of diameter along the longitudinal axis, or taper, will be indicated. The gauge may be readily checked at any time by applying master ring gauges.

The constant use of a particular plug will result in wear but this wear is taken up by the plating 36. The wear does not affect the accuracy of the gauging because of the recessing of the nozzle terminal surfaces 44 below the periphery of the gauge plug.

When the wear is of an appreciable extent and before the same reaches the nozzle terminal surfaces 44, the gauge plug may be stripped of the plating 36, reground, replated and the replated peripheral surface reground to its initial finished diameter and used as before.

I claim:

1. In a pneumatic comparator gauge, means for supplying gauging fluid at substantially constant pressure through a restriction, a body member having a fluid space therein, a gauge plug member mounted on said body member and having an outer peripheral surface for receiving the work to be gauged, said plug member having the interior thereof in communication with said fluid space, nozzle members carried by said plug member for the discharge of gauging fluid against the work to be gauged and terminating below the exterior surface of said plug member, indicating means in communication with said fluid space and said interior responsive to the pressure determined by the discharge through said nozzle members, said peripheral surface having a wear resistant coating for contact with the work to be gauged and for determining the clearance between the terminal ends of said nozzles and the work to be gauged.

2. In a pneumatic comparator gauge, means for supplying gauging fluid at substantially constant pressure, a body member having a fluid space therein to which fluid is supplied from said supply means through a restriction, a gauge plug member mounted on said body and having an outer peripheral surface for receiving the work to be gauged, said plug member having the interior thereof in communication with said fluid space, a pair of diametrically opposed nozzles carried by said plug member for the discharge of gaging fluid against the work to be gauged, indicating means in communication with said fluid space and said interior responsive to the pressure in said space and said interior determined by the discharge through said nozzles, said outer peripheral surface having a plated wear coating for contact with the work to be gauged and for spacing the terminal ends of said opposed nozzles from the work to be gauged.

3. In a pneumatic gauge, a member having an outer cylindrical surface for receiving the work to be gauged, opposed nozzles formed integrally therein and terminating beneath said cylindrical surface, said member having discharge passages adjacent said nozzles, means to supply fluid under pressure to said nozzles, and said outer surface having a wear resisting coating whereby the thickness of the coating on the work engaging surface determines the clearance between the terminal ends of the nozzles and the work engaging surface of the gauge.

4. In a pneumatic comparator gauge having a fluid supply line and a restriction in said line, pressure indicating means, a gauge plug member having an external surface for receiving the work to be gauged, and a gauging fluid discharge nozzle terminating below said surface, said gauge plug member having an internal bore and a sleeve mounted in said bore, said sleeve having an interior passageway in communication with said nozzle and said supply line, said pressure indicating means being in communication with said interior passageway for indicating the pressure therein as determined by the discharge through said nozzle.

5. In a pneumatic comparator gauge, pressure indicating means, a gauge plug member having an external surface for receiving the work to be gauged and a pair of alined gauging nozzles terminating below said surface, said gauge plug member having an internal bore and a sleeve mounted in said bore, said sleeve having an internal longitudinal passageway of lesser diameter than said bore for reducing the internal volume of said plug member, and having radial openings in communication with said nozzles, said pressure indicating means being in communication with said internal passageway for indicating the pressure therein as determined by the discharge through said nozzles.

6. In a pneumatic gauge, a gauge member having a cylindrical surface, opposed radially disposed nozzles formed in said gauge member and terminating at said cylindrical surface for supplying fluid under pressure for discharge through said nozzles, said gauge member having external discharge passages for the discharge of fluid from the vicinity of said nozzles, and a plated wear resistant coating on said cylindrical surface for providing an external surface for the reception of the work to be gauged and for determining the clearance between the terminal ends of the nozzles and the external surface of the gauge.

7. In a pneumatic comparator gauge, a gauge plug member having an outer surface for receiving the work to be gauged, a nozzle in said plug member for determining the discharge of gauging fluid against the work to be gauged, a circular groove surrounding the outer terminus of the nozzle and spaced therefrom, a longitudinal slot extending from said groove for free discharge of fluid to the atmosphere, and said outer surface having a wear resisting coating for contact with the work to be gauged and for spacing the terminal end of said nozzle from the work to be gauged.

COLEMAN B. MOORE.